Patented Jan. 7, 1930

1,742,519

UNITED STATES PATENT OFFICE

CONRAD F. SCHRIMPE, OF WOODBRIDGE, NEW JERSEY, ASSIGNOR TO BAKELITE CORPORATION, OF NEW YORK, N. Y., A CORPORATION OF DELAWARE

METHOD OF PREPARING CONDENSATION PRODUCTS OF ACETYLENE AND PHENOLS

No Drawing. Original application filed August 15, 1922, Serial No. 582,055. Divided and this application filed March 8, 1927. Serial No. 173,799.

This invention relates to phenolic condensation products, and comprises a novel process whereby phenolic resins, and more particularly such resins of the so-called "non-reactive" type, may be prepared by the reaction of acetylene upon phenols in the presence of a suitable catalyst. By "non-reactive" resins I mean such resins as are fusible and soluble and are not readily transformed by simple heating at moderate temperatures into insoluble and infusible condensation products. It is now well known that such non-reactive resins are readily prepared by the interaction of phenol with formaldehyde, or equivalent bodies having a mobile methylene group, or with acetaldehyde.

I have discovered that a resinous product having the essential characteristics of the resin derived from acetaldehyde (compare Baekeland and Gotthelf, Serial No. 346,104, filed December 19, 1919) may be simply and easily prepared by reacting upon phenol, cresols or phenolic bodies in general, with acetylene. This reaction may be carried out under a wide variety of conditions, involving the presence or absence of water, and the presence or absence of solvents (acetone, alcohols or the like) for the resin; and although I will describe the invention by reference to certain specific embodiments thereof, it is to be understood that the examples given are illustrative only, and not restrictive. In whatever way the fusible and soluble resin may be produced it exhibits the peculiar and characteristic property of the phenol resins of the fusible and soluble type, of being capable of reacting with methylene-containing bodies such as formaldehyde, paraform or the like, to yield an infusible condensation product; and likewise, of reacting with amino—or amido—bodies of the type of hexamethylene-tetramine, hydrobenzamid, furfuramid, etc. with liberation of ammonia and formation of these infusible condensation products. All such bodies as are capable of effecting this transformation of the fusible resins into the infusible condensation products are referred to hereinafter as "hardening agents."

*Example 1.*—2.2 kilograms of phenol, 880 c. c. of water, 220 grams of concentrated sulfuric acid, and 45 grams of mercuric sulfate are charged into an enameled vessel provided with an efficient stirring device, and preferably with a jacket or other suitable means for controlling the temperature. Acetylene is bubbled through the mass, whereupon a vigorous exothermic reaction ensues, which may be controlled as desired by cooling or by suitably regulating the flow of acetylene. After some hours the reaction slows down or may even cease, but may be again activated by the addition of fresh quantities of mercuric sulfate; and this may be repeated several times, or until the mass acquires a molasses-like consistency. Application of further heat at this stage will impart additional fluidity to the mass, thus permitting the catalyst to settle out. The resulting reaction mass comprises an upper aqueous layer of acid solution, which is decanted, and a viscous or fluid resinous product. This latter is thoroughly washed with distilled water to eliminate all free acid, and may then be heated to 190°–200° C. to eliminate uncombined phenol; or the free phenol or any desired proportion thereof may be removed by any desired method, as by distillation with steam. The residual product is a clear, transparent fusible resin, having the essential characteristics of the phenol-acetaldehyde resins already mentioned. Accordingly it may replace these in their commercial applications, particularly those involving their transformation, either with or without added filling materials, into phenolic condensation products of the insoluble type through reaction with hexamethylenetetramine or other hardening agents.

It is desirable to arrest the reaction while the resinous product, at an appropriate temperature, is sufficiently fluid to permit complete subsidence of the mercuric catalyst, although of course the resin, if too thick to permit this separation, may be purified by solution, and subsidence or filtration, as a separate operation. Or solvents may be present during the reaction, thereby insuring a sufficiently fluid mass or melt. In fact the free phenol in the preceding example functions as such a solvent and may be replaced wholly or in part by other appropriate solvents, including acetone, without departure from my invention.

*Example 2.*—The reaction mixture consisted of 2 kg. of phenol, 20 c. c. of concentrated sulfuric acid, 50 grams of acetone and 45 grams of mercuric sulfate. Upon introduction of acetylene the reaction proceeds vigorously and may be completed within a few hours. By reason of the volatility of the acetone it is desirable to operate under a reflux condenser, and cooling is preferably employed.

The use of acetone, or of any equivalent material having a solvent power both for acetylene and for the resin which is the reaction product, is particularly advantageous in its effect upon the reaction; and in the operation as above described it was not found necessary to introduce further quantities of the catalyst.

The exhausted catalyst is freed from resin by means of alcohol, acetone or other solvent, and appears to comprise a mixture of mercury, mercuric sulfate and perhaps mercurous oxid. It may readily be regenerated by known methods.

*Example 3.*—Into the apparatus as described above were charged 2 kg. of phenol, 20 c. c. of concentrated sulfuric acid, and 40 grams of mercuric sulfate, acetylene being bubbled through the mixture as before. In this case there was little or no evolution of heat and no further addition of mercuric sulfate was required, but after 24 hours a mass of crystals were obtained, which were separated from the free phenol and mercuric sulfate, and recrystallized from water. These crystals were found to react readily with hexamethylenetetramine and with other methylene-containing hardening agents, yielding therewith an infusible amber-colored resin.

As regards the reactions involved in these several examples, I do not desire to limit my invention by any considerations of a theoretical nature, but I believe it probable that under the conditions of Examples 1 and 2, acetaldehyde is formed as an intermediate product, and reacts immediately in the acid bath with the phenol, yielding a phenol-aldehyde resin of the kind described in the Baekeland and Gotthelf application already mentioned. Under the approximately anhydrous conditions as described in Example 3, the reaction appears to stop at a definite crystalline stage, of which the ultimate crystalline product appears to be ethylidene-di-phenol:

It is considered probable that in this case the first reaction product is vinyl sulfuric acid:

$$CH:CH + H_2SO_4 = CH_2:CHSO_3OH$$

which in presence of the phenol reacts the latter forming ethylidene-di-phenol.

As already stated this phenolic body reacts readily with hexamethylenetetramine and its equivalents to yield phenolic condensation products of the known type, which are infusible when sufficient of the hardening agent is employed.

By continuing the reaction as described under Example 1 or 2 for a sufficient time, it is possible to prepare directly resins which are reactive in the sense that simple heating will render them infusible. I prefer however to arrest the reaction at a point where the resinous product is still of the fusible and soluble, or "non-reactive" type, since thereby the separation and recovery of the exhausted catalyst is greatly facilitated. These fusible resins may be thereafter hardened in known manner by the hardening agents as already mentioned.

My invention is of course not limited to the use of mercuric sulfate and sulfuric acid as catalysts for the reactions involving acetylene and phenols; or acetylene, water and phenols; since many other catalysts for these reactions including carbonaceous catalysts of the activated type have been proposed heretofore.

This application is a division of my copending application Serial No. 582,055, filed August 15, 1922.

I claim:

1. Method of preparing ethylidine-diphenol which comprises reacting with acetylene upon a mixture of phenol, concentrated sulfuric acid and mercuric sulfate in the relative proportions of 2000 parts by weight of phenol, 37 parts by weight of concentrated sulfuric acid and about 40 parts by weight of mercuric sulfate, in the absence of an added solvent for the product.

2. Method of preparing a crystalline product consisting essentially of ethylidine-diphenol, which comprises reacting with acetylene upon a mixture of phenol and relatively small and approximately equal amounts of concentrated sulfuric acid and of a mercuric compound in the absence of water and of an added solvent for the reaction product, the reaction being effected under such conditions that substantial self-heating of the reaction mixture does not occur.

In testimony whereof, I affix my signature.

CONRAD F. SCHRIMPE.